E. B. ELLICOTT.
MEASURING AND FILLING APPARATUS.
APPLICATION FILED MAY 1, 1905.

933,964.

Patented Sept. 14, 1909.
2 SHEETS—SHEET 1.

Witnesses:
Leonard W. Novander.
Charles J. Schmidt.

Inventor
Edward B. Ellicott
By Charles A. Brown
Attorney

E. B. ELLICOTT.
MEASURING AND FILLING APPARATUS.
APPLICATION FILED MAY 1, 1905.
933,964.
Patented Sept. 14, 1909.
2 SHEETS—SHEET 2.
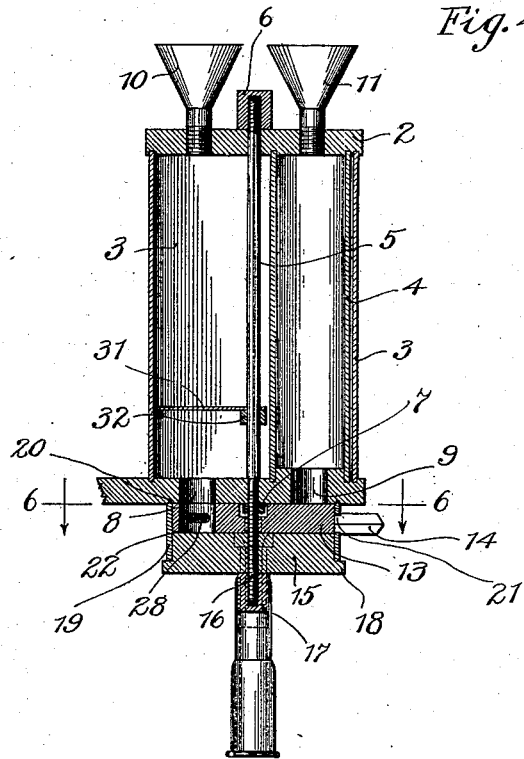
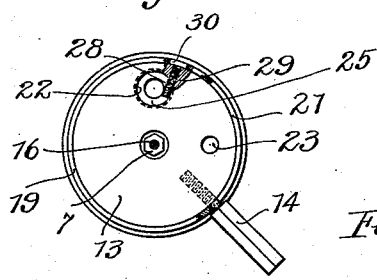
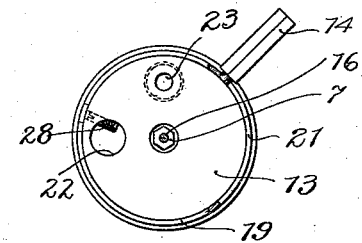
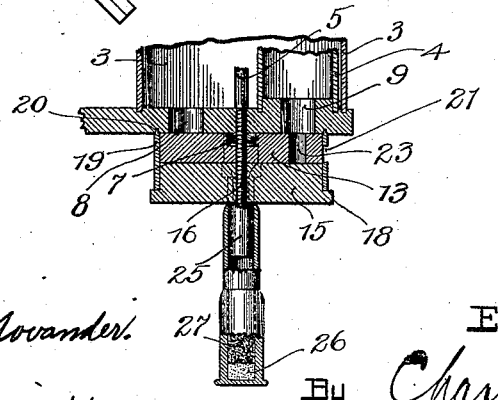
Witnesses:
Leonard W. Novander
Charles J. Schmidt
Inventor
Edward B. Ellicott
By Charles A. Brown
Attorney

UNITED STATES PATENT OFFICE.

EDWARD B. ELLICOTT, OF CHICAGO, ILLINOIS.

MEASURING AND FILLING APPARATUS.

933,964.　　　　Specification of Letters Patent.　Patented Sept. 14, 1909.

Application filed May 1, 1905. Serial No. 258,144.

*To all whom it may concern:*

Be it known that I, EDWARD B. ELLICOTT, citizen of the United States, residing at Chicago, in the county of Cook and State of Illinois, have invented a certain new and useful Improvement in Measuring and Filling Apparatus, (Case 4,) of which the following is a full, clear, concise, and exact description, reference being had to the accompanying drawings, forming a part of this specification.

My invention relates to measuring and filling apparatus, and particularly to a device for measuring powder and for filling the measured quantities into shells.

My improved device is particularly designed for measuring different kinds of powder and for filling the measured quantities into cartridge shells, for instance, for rifles, and the device consists of a plurality of chambers each forming a receptacle for powder and from which receptacles outlet openings lead. A spout leads from the device to which are applied cartridge blanks to be filled. A measuring and conveying member is disposed between the spout and the openings from the powder chambers, and upon movement in one direction of this measuring member a quantity of one powder is received thereby, and upon motion in another direction this powder is conveyed to the spout and to the shell, while at the same time another measuring compartment in the measuring member is filled from another powder chamber, and upon further motion of the measuring member this powder in turn is brought to the spout and delivered to the shell.

The device includes novel and improved features of construction and arrangement which will be best understood with reference to the accompanying drawings, in which—

Figure 1:
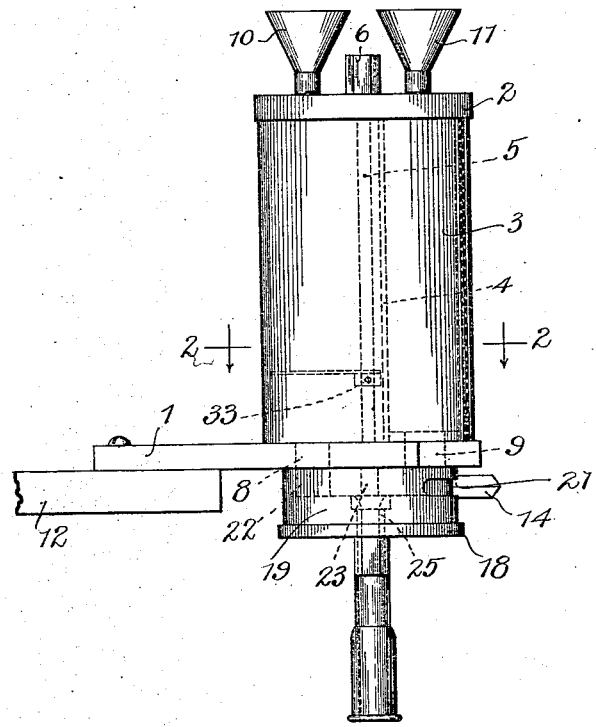
Figure 2:
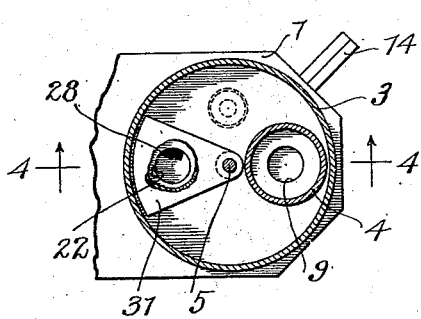
Figure 3:
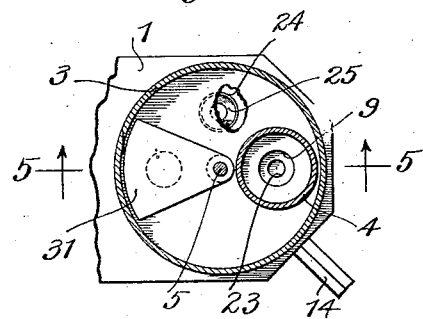

Figure 1 is an elevation view of the device. Fig. 2 is a sectional view thereof taken on line 2—2 of Fig. 1 and showing the measuring element in one position. Fig. 3 is a section also taken on line 2—2 of Fig. 1 but showing another position of the measuring and conveying member. Fig. 4 is a longitudinal sectional view taken on line 4—4 of Fig. 2. Fig. 5 is a longitudinal sectional view taken on line 5—5 of Fig. 3. Fig. 6 is a sectional view taken on line 6—6 of Fig. 4 showing the measuring element in one position, and Fig. 7 is also a section taken on line 6—6 of Fig. 4 showing the measuring element in a different position.

The device consists of a mounting or supporting board 1 and a cap member 2 between which are clamped the cylindrical tubes 3 and 4 by means of the clamping screw 5 passing through the cap and supporting board and engaged at the top by the cap nut 6 and below the supporting board by the nut 7. The tubes 3 and 4 are preferably of transparent material such as glass, and the smaller tube 4 is disposed within the larger tube 3 as shown. Openings 8 and 9 lead through the supporting board, the opening 8 leading from within the tube 3 and the opening 9 forming an outlet for the tube 4. Funnels 10 and 11 are provided for the tubes 3 and 4 respectively, and extend through the cap 2. The support 1 may be screwed or otherwise secured to a table or other support 12.

Directly below the supporting board 1 and preferably concentric with the tube 3 is a measuring and conveying disk 13 to which is secured the actuating handle 14. A cylindrical base member 15 of the same diameter as the measuring member 13 is disposed concentric therewith, and this base member and the measuring element are held in position by means of the extension 16 from the clamping screw 5, this extension at its end being engaged by the clamping nut 17. The base member 15 is provided with the annular flange 18 between which and the supporting board is supported the retaining shell 19 lying adjacent to the cylindrical members provided with the pins 20 which engage in the base member to at all times hold said shell in its proper position. Through one wall of the shell is the slot 21 through which passes the end of the handle 14 into threaded engagement with the measuring element which upon actuation of the handle within said slot is rotated. An opening 22 extends through the measuring element to form a measuring compartment adapted to register with the outlet opening 8 from the tube 3, and an opening or channel 23 extends through the measuring element adapted upon rotation of said element to register with the outlet opening 9 from the tube 4. An opening or passageway 24 extends through the base member 15 and a spout 25 is supported in said opening. The centers of the outlet openings 8 and 9 and of the opening in the measuring element and the base member are all disposed in the circumference of the same circle centered at the axis of the members, and thus upon actuation of the handle 14 the measuring element is rotated to bring its measuring compartments into register with the outlet openings from the tubes or to register with the spout opening. The openings 8 and 9 are preferably on the same diametrical line while the compartments 22 and 23 are displaced 90 degrees, the slot 21 also extending through an arc of 90 degrees to limit the movement of the actuating handle thereto.

The operation of the device is as follows: The tubes are filled through the funnels with powder, and when rifle shells are to be filled the smaller tube 4 may contain white powder, for instance, and the larger tube may contain the black powder. The various parts will assume the arrangement shown in Figs. 3, 5 and 7 with the shell in position over the spout. The measuring compartment 23 is in register with the outlet 9 of the small tube and this compartment consequently will be filled with the white powder, the solid part, however, of the measuring element being disposed at the outlet 8. The actuating handle in this position is at the forward end of the slot and is moved to the other end of the slot to bring the compartment 23 over the entrance of the spout as shown in Figs. 2, 4 and 6, the charge 26 of white powder falling through the spout and into the cartridge shell. At the same time the compartment 22 is brought below the outlet 8 and is filled with black powder, and when the handle is again brought to the forward end of the slot this compartment will be brought over the spout opening and the charge 27 of black powder led into the shell which may then be removed to another machine to receive the bullet.

The capacity of the compartment 22 may be varied by means of a screw 28 passing therethrough and through the opening 29 in the measuring element, the end of this screw being opposite an opening 30 in the shell 19 when the handle is at the forward end of the slot and the screw accessible to a screwdriver or other instrument. Although not shown a similar means may be provided for adjusting the capacity of the compartment 23.

As there might be danger of ignition of the powder, owing to the friction which would result on particles in the compartments, or which might become lodged between the members, the base member, rotating member and the supporting board are made of hard rubber, as rubber will not cause frictional ignition of powder. By means of the clamping nut 17 clamping engagement between the members may be adjusted.

One of the main features of my invention provides means for preventing packing of the powder and thereby destroying the accuracy and uniformity of the cartridges. If the black powder in the tube 3 were unhindered, its weight, pressing on the powder which is fed to the compartment 22, would compress it, and as a result more black powder would be fed to the shells when the tube 3 is comparatively full than there would be when the powder in the tube became low. To prevent this irregularity in the black powder charges I provide a disk or horizontal wing 31 which may be secured to the clamping rod 5 by means of the hub 32 and pin or set screw 33. This wing is disposed above the outlet opening 8 and serves to check the weight of the powder and to cause a uniform and regular feed thereof into the black powder measuring compartment, and all the black powder charges thereby rendered equal, which is a very desirable feature in rifle cartridges, it being well known that the difference of a few grains would make a considerable difference in the projectile properties of the cartridge. This wing may be placed at various distances from the opening 8, but to obtain the best results it is placed on a level with the top of the slope assumed at the opening 8 by the powder left in the tube 3 after the other powder has been emptied therefrom, and when the tube is again filled the powder will flow into the measuring compartment in a natural manner and free from packing. Packing preventing means of this kind might also be employed in the tube 4 but this is unnecessary when the explosive, such as white powder, is very light.

I thus provide a very useful device for rapidly filling cartridge shells, the device being entirely automatic in its measurement and in its filling, it being merely necessary to hold the cartridge below the spout and to actuate the handle within its slot. By means of the packing preventing disk all the charges will be uniform, and the glass tubes render the powder visible at all times. The various parts having frictional engagement being made of rubber absolutely prevents any danger from frictional ignition. The device being also constructed of simple cylindrical parts and of other parts which may be bought finished on the market can be manufactured with little expense. Changes, however, in the arrangement and construction of these parts may be made without departing from the spirit and scope of my invention. I do not therefore wish to be limited to the exact construction and arrangement as shown, but

I claim as new and desire to secure by Letters Patent:

In a measuring and filling device, the combination with a chamber for receiving comminuted material, of a dispensing outlet at or near the bottom of said chamber, a vertical rod in said chamber, and a horizontal plate vertically adjustable on said rod, said plate in any adjusted position adapted to maintain constant the pressure of said material at said outlet.

In witness whereof, I hereunto subscribe my name this 28th day of April A. D., 1905.

EDWARD B. ELLICOTT.

Witnesses:
CHARLES J. SCHMIDT,
LEONARD W. NOVANDER.